United States Patent [19]
Parish

[11] 4,262,752
[45] Apr. 21, 1981

[54] GROUND WHEEL AND PLOWING IMPLEMENT CONNECTED THERETO FOR FILLING WHEEL TRACKS

[75] Inventor: Carl D. Parish, Earth, Tex.

[73] Assignee: K-M-P Pump Company, Inc., Earth, Tex.

[21] Appl. No.: 37,850

[22] Filed: May 10, 1979

[51] Int. Cl.³ ............................................. A01B 37/00
[52] U.S. Cl. .................................... 172/574; 172/618; 172/676; 172/602
[58] Field of Search ................. 172/25, 134, 349, 488, 172/574, 602, 603, 618, 676, 577, 712, 385; 239/177, 212, 213

[56] References Cited
U.S. PATENT DOCUMENTS

| | | | |
|---|---|---|---|
| 1,161,919 | 11/1915 | Biebinger | 172/385 |
| 3,640,347 | 2/1972 | Miller | 172/349 |
| 4,059,911 | 11/1977 | Bean et al. | 172/574 X |
| 4,192,388 | 3/1980 | Goebel | 172/676 X |
| 4,209,068 | 6/1980 | Corsentino | 239/177 X |

Primary Examiner—Richard T. Stouffer
Attorney, Agent, or Firm—Harvey B. Jacobson

[57] ABSTRACT

A plowing implement is disclosed for following and filling wheel tracks created, for example, behind a pair of sprinkler wheel tires, particularly arrangements in which each tire repeatedly traverses the same fixed path. When the track created by the tire is filled with earth by the device of the present invention, plowing or harvesting equipment can cross the path travelled by the wheels without the inconvenience of traversing rough or uneven ruts or tracks which would otherwise be the result.

7 Claims, 5 Drawing Figures

GROUND WHEEL AND PLOWING IMPLEMENT CONNECTED THERETO FOR FILLING WHEEL TRACKS

BACKGROUND OF THE INVENTION

1. Field of the Invention

The invention relates to agricultural equipment for field use. More particularly, the invention discloses a track filler device which follows behind a sprinkler wheel tire for the purpose of throwing dirt which has been pushed by the sprinkler tires to form a track or rut in a manner which levels the ground and reduces or eliminates the track formed by the tire. Adjustability is provided, as well as the capability of motion in the reverse direction without damage to the device or adversely affecting subsequent performance of the device when forward motion is resumed.

2. Disclosure Statement

C. H. Ihde, U.S. Pat. No. 2,224,051, issued Dec. 3, 1940, discloses a planter attachment for covering the tracks left by wheels of a planter. An angular bar follows behind the wheel and holds a pair of diverging axles on which are mounted a pair of rearwardly converging disks which may be raised and lowered to operate at a desired depth in throwing the earth over tracks left by the wheel. In U.S. Pat. No. 1,252,658, issued Jan. 8, 1918, to W. P. Butler, a device is disclosed attachable to the frame of a corn planter to form a ridge rearwardly of each of the planter supporting wheels. E. Steffen, U.S. Pat. No. 2,533,150, issued Dec. 5, 1950, discloses a wheel ridge leveling device, operating thrugh action of a level blade adapted to lever the ridge formed by the rim of the wheel. Other patents relating generally to plow attachments and the like include the following: U.S. Pat. No. 2,659,291, to W. H. Tanke, issued Nov. 17, 1953, and U.S. Pat. No. 674,282, issued May 14, 1901, to W. C. Pope.

None of the devices for filling wheel tracks mentioned above discloses a pair of plowing implements with holding rods and adjusting collar for adjustment to conform to track width, nor is a swiveling feature disclosed to permit both forward and reverse movement of the wheel.

SUMMARY OF THE INVENTION

An object of the invention is to provide a device for followingly filling the track created by a wheeled vehicle, particularly a track formed by repeated traverse of the same pathway by the wheels of the vehicle.

Another object of the invention is to provide a plowing implement for filling wheel tracks which is adjustable laterally to permit tracks of different width to be accommodated.

Still another object is to provide a swiveling feature to permit the device to followingly fill a track in the forward direction, while also allowing reverse movement of the wheel in a manner which avoids jamming as the plowing implement is pushed ahead of the wheel.

Yet another object is to provide swiveling means to permit the plowing device to follow the contour of ground being traversed behind the wheel.

A further object is to provide a device of the class described useful for filling soil of the type commonly encountered in dry climatic regions where sprinkler-type irrigation is typically required for successful growing of field crops.

Another further object is to provide a device useful in cultivated fields of corn, cotton, soy beans, and the like, growing in regions requiring irrigation which lasts the season, the device being particularly needed at the conclusion of the growing season and prior to harvesting in order to permit a relatively level field surface for traversal by combines, harvesters, and the like.

Still another further object is to save in fuel consumption required to level uneven soil in a separate operation from the motion of the sprinkler wheels.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

It is often the case that in arid regions, artificial watering means, such as sprinkler assemblies, are provided in order to furnish sufficient moisture to allow such field crops as corn, cotton, soybeans, and the like, to grow to maturity during the course of a single growing season. Typically, such sprinkler assemblies include a plurality of support structures attached to a wheel means, each support structure supporting a length of water pipe with the lengths of sprinkler water pipe being arranged essentially linearly, with one end of the line serving as the source of water, such as a well, tap, or the like. Each wheeled supporting assembly then moves in a manner which permits the entire string of pipe lengths to describe a circular motion centered about the water source. Typically, several days might be required for a complete traverse of the circle of coverage represented by a single pipe string. During the course of such revolution, each wheel assembly will require a continuous source of power to undergo the motion necessary to describe the path required. Accordingly, each wheel means is generally provided with a source of power, such as an electric motor, to permit travel in the forward direction until a circuit is completed. Repeated traverses of the same pathway causes formation of a rut, whose depth tends to increase with each successive traverse, unless the plowing implement of the present invention is provided to follow behind the wheel means of the support assembly and to throw upraised soil back in the rut formed by the wheel means, thereby levelling the field surface. Such levelling is particularly necessary, for example, during the harvesting phase of irrigated cultivation, when combines, harvesters, tractors, and the like, must traverse the field planted in the irrigated crop. When the present invention smoothes or levels the field surface, such items of heavy mechanical equipment can expeditiously traverse the cultivated surface without experiencing bumps, equipment damage, or operator inconvenience or possible injury. Also, such levelling eliminates a source of possible erosion during times of heavy rain.

Figure 1:
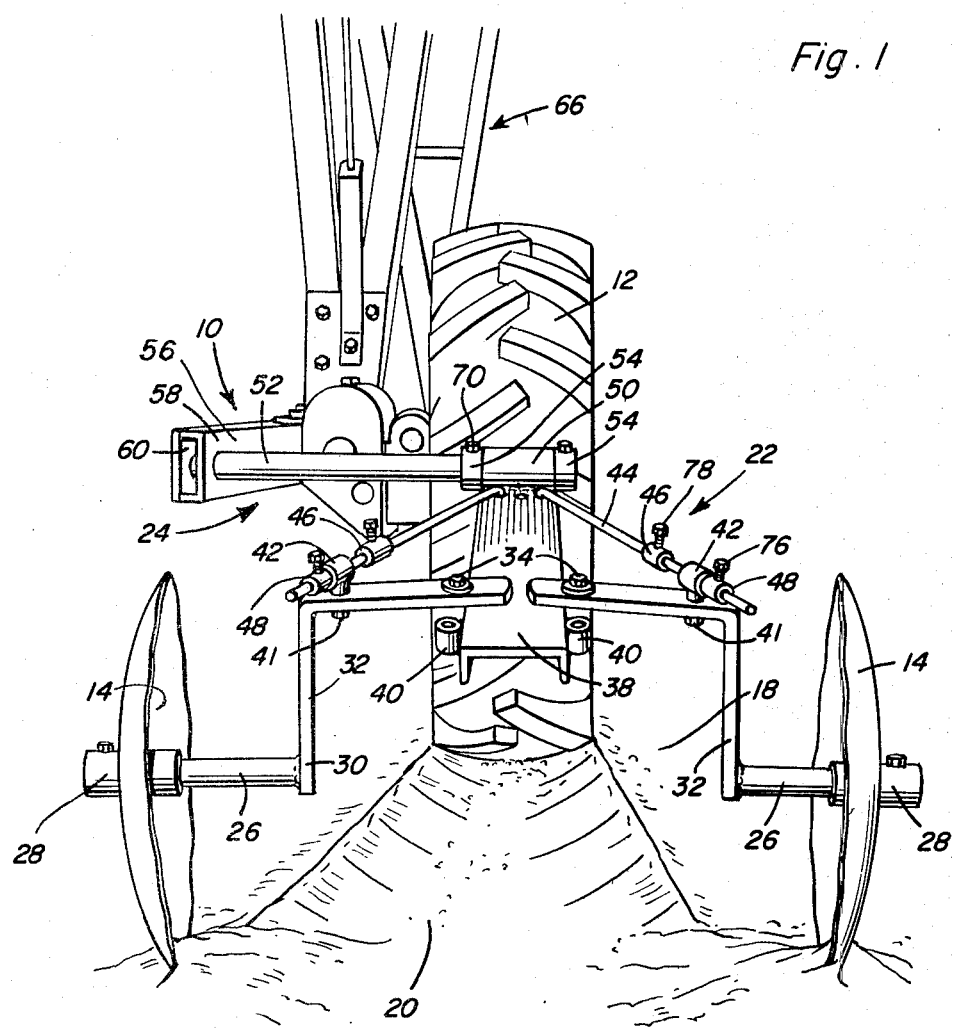
FIG. 1 is a perspective view from the rear looking forwardly to the device of the present invention toward a sprinkler structure support and an associated wheel.
Figure 2:
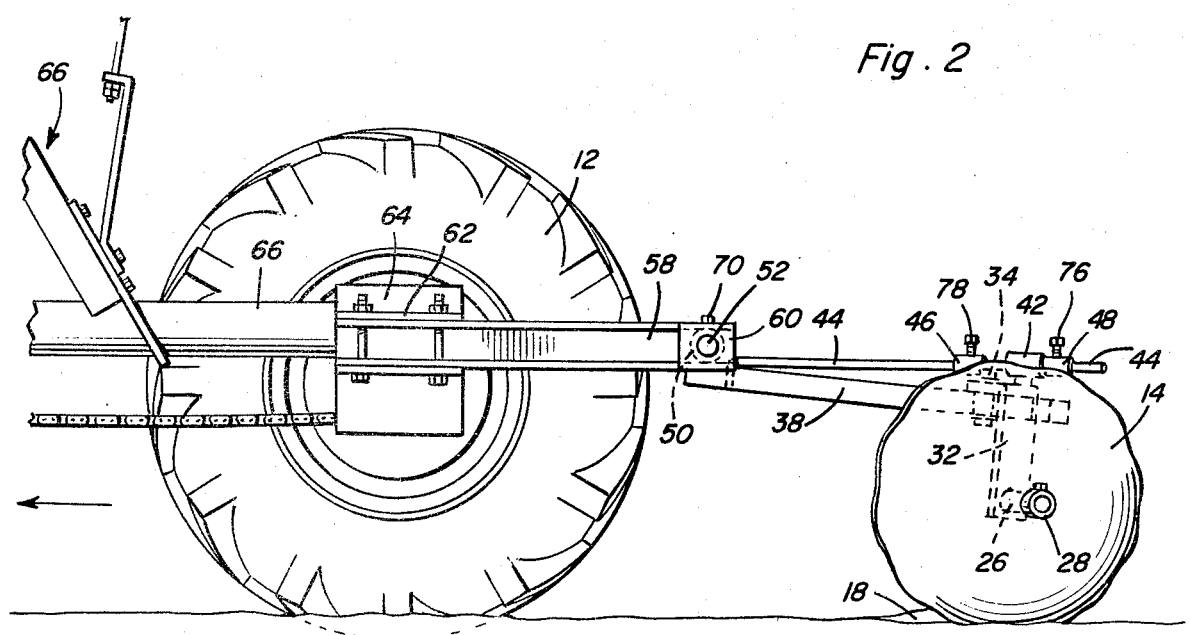
FIG. 2 is a side elevational view of the structure of FIG. 1, looking toward the plowing device from the leftward direction.

Accordingly, plowing device 10 is attached to followingly travel behind wheel 12, which is moving away from the observer in FIG. 1.

Device 10 is made up of a pair of disks 14, which are scalloped in a manner well-known in the art to assist in drawing soil from ridge 18 upwardly and inwardly so as to fill rut or trench 20, formed by wheel 12. Each of disks 14 is held in place by mounting assembly 22, which is in turn attached to and pulled by pulling and swiveling assembly 24.

Mounting assembly 22 is made up of disk axles 26, at the end of which is journaled wheel bearing assembly 28, to which disks 14 are attached in a conventional manner. Axles 26 are attached through weldment 30 to L-shaped support beam 32, although other attaching means to perform the same function can also be used. Support beam 32 is bolted with bolts 34 to mounting collars 36, which are attached, such as through welding to pulling assembly 24 at channel bar 38. Alternative mounting collars 40 are situated rearwardly of collars 36 and choice of collars 36 or 40 permits selection of the degree of separation between disks 14, as well as the angular orientation of disks 14 with respect to the direction of travel. Support beam 32 also contains mounting 41 for adjusting collar 42. Adjusting collar 42 is free to slide longitudinally along holding rod 44, between forward stop 46 and rear stop 48. Ordinarily, adjusting collar 42 will rest against rear stop 48 as wheel 12 moves in the forward direction and pulls plowing device 10 followingly behind. However, in the event wheel 12 moves rearwardly in the reverse direction, adjusting collar 42 is free to slide along holding rod 44 forwardly, as far as front stop 46. This protective action, to be described in further detail hereinafter, occurs automatically whenever wheel 12 reverses direction, and does not require personal attention of an operator to place into effect.

Pulling assembly or trailing arm 24 is made up of channel bar 38 and swivel collar 50, which permits pivoting upwardly and downwardly of the mounting assembly to permit mounting assembly 22 to follow the contour of the land as disks 14 are lifted or dropped in the course of their travel. Swivel collar 50 is held in place on follower rod 52 by locking collars 54, which restrict the sidewise motion of swivel collar 50. Follower rod 52 is attached at the rearward end of channel-shaped pull bar 56. Pull bar 56 is provided at its rearward end 58 with locking plate 60, which serves the purpose of facilitating attachment of follower rod 52. Bracket 62 attaches the forward end of pull bar 56 to drive housing 64, which is supported by support structure 66 of the sprinkler assembly.

Locking collars 54 are secured to follower rod 52 by machine screws 70, or equivalent fastening means, such as set screws, or the like. Holding rod 44 is attached at its downturned forward end 72 by washer 74 and cotter pin 76. Further, rear stop 48 is attached to holding rod 44 by machine screw 76, and forward stop 46 is attached by machine screw 78 to holding rod 44. Follower rod 52 is attached to pull bar 58 by conventional journaling means, which can include appropriate bearings to permit free rotation of follower rod, or alternatively, follower rod 52 can be attached in fixed relation to pull bar 58.

Figure 3:
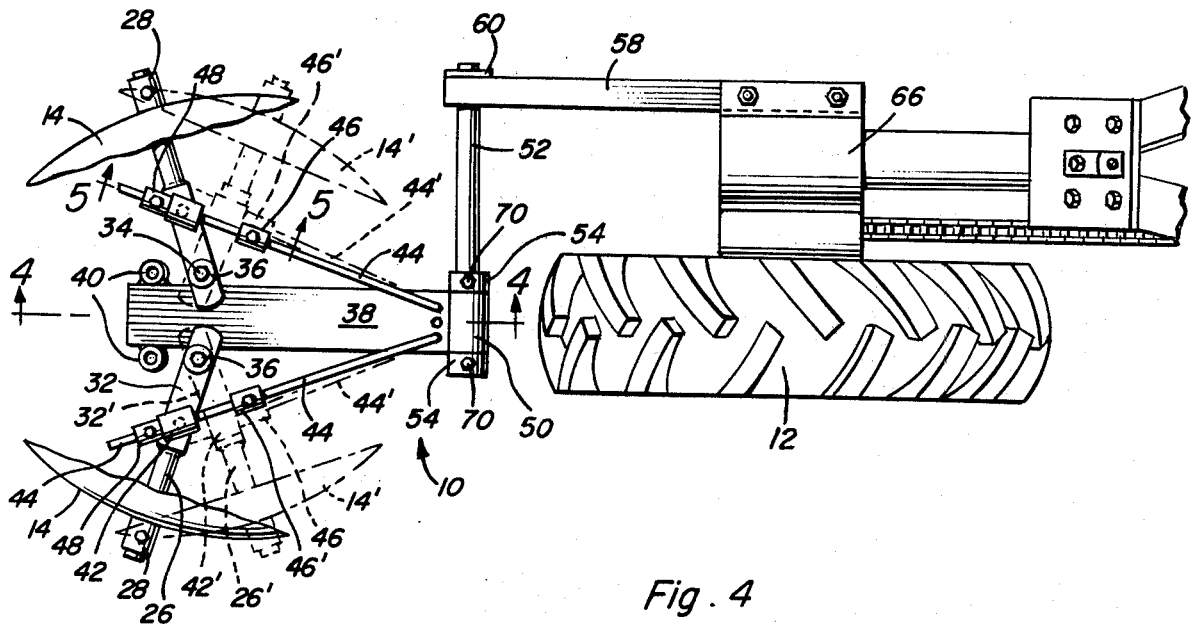
FIG. 3 is a top plan view of the device of the invention in use when being pulled forwardly, showing (in phantom) the arrangement which characterizes the device when moving in the reverse direction.
Figure 4:
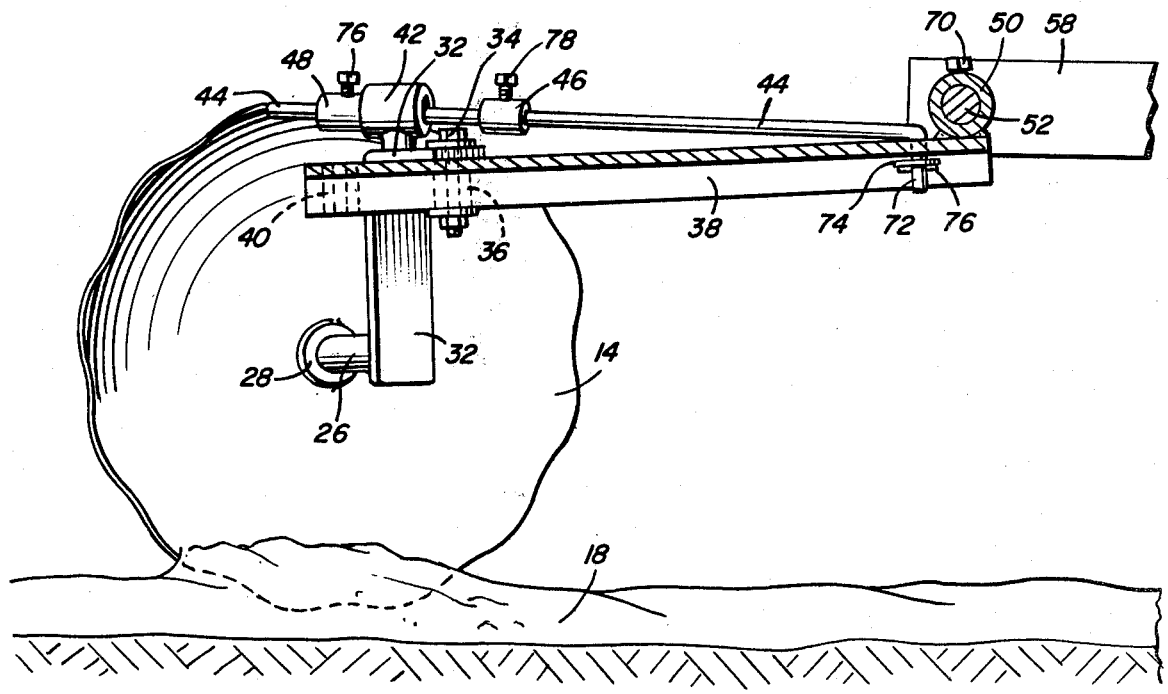
FIG. 4 is an enlarged fragmentary view of the rear portion of the plowing implement, taken substantially upon a plane passing along section line 4—4 on FIG. 3.
Figure 5:
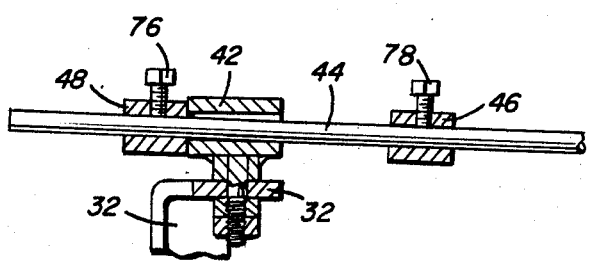
FIG. 5 is a fragmentary sectional view of the holding rod and associated components, taken substantially upon a plane passing along section line 5—5 on FIG. 3.

As is apparent from FIG. 3, disks 14 can swivel forwardly to the position shown in phantom, which swiveling will occur automatically whenever the direction of rotation of wheel 12 is reversed, so as to push, rather than pull, device 10. Although the device is not intended to be operated in the reverse direction to perform the function of filling tracks, some degree of heaping of soil will occur when disks 14' are in the position shown in phantom in FIG. 3. Accordingly, the track or rut left behind wheel 12 will be somewhat less in depth than would otherwise be the case. Accordingly, although the device of the present invention is primarily intended for use when following or being pulled by a wheeled structure, it also has limited utility when operated in the reverse direction. In any event, automatic adjustment by swinging to the rearward position prevents jamming or blocking of rearward travel of structure 66 in the event that such reverse movement is necessitated. Such reverse movement is frequently necessary in practice, as in avoiding an obstacle, or the like. As is best seen in FIG. 3, mounting assembly 22 performs its automatic adjustment function by backward swiveling when reverse movement of wheel 12 occurs, adjusting collar 42 sliding forwardly on rod 44 to the position 42' and rod 44 sliding somewhat outwardly to the position 44'. Forward sliding of the adjusting collar occurs until contact is made with forward stop 46', to the position shown in phantom in FIG. 3. Disk 14' will then turn in concert with the reverse direction of movement until such reverse movement ceases, and forward movement against is resumed. At such time as forward movement begins, the disks again resume their rearward position and operation resumes in the usual fashion without the necessity for manual attention by an operator.

Disk 14 can be adjusted for the tire width of wheel 12 by sliding of bearing assembly 28 on axle 26. Alternatively, adjustment can be obtained by choosing mounting collar 36 or 40, in concert with adjustment of the position of rear stop 48, thereby adjusting both the outward extent of disk 14 and the angle formed with respect to the direction of motion.

It should be noted that commonly the supporting structure of a sprinkler system, such as is illustrated in the drawings, includes wheel means arranged with a pair of wheels 12, the two wheels being adapted to follow in the same track. Accordingly, the plowing device 10 of the present invention will in such an arrangement fill the rut left be two wheels whose alignment could either be or become slightly askew. Accordingly, periodic adjustment of the width of track could become required during normal use and operation of the device. It should further be noted that a plurality of wheel pairs typically is used to support lengths of sprinkler tubing, and accordingly, each pair of wheels will ordinarily require a device 10 of the present invention.

It is clear from the description of the invention hereinabove that no external source of power is required for operation thereof, it being apparent that the only source of power necessary for operation of the plowing device is that required to pull the apparatus. Such a minimal increase in power consumption is clearly less than that which would be required for pulling a conventional tiller or other such device in a separate operation for leveling of tracks left by wheels of a sprinkler system. Moreover, with the present invention, the labor costs, as well as fuel costs, involved in separately smoothing tracks left by sprinkler wheels is avoided.

It is further apparent from the structure and operation described that adjustment of the position of rear stop 48, as well as selection of mounting collar 36 or 40 permits adjustment of the throw of dirt possible with the plowing device of the present invention. Further, the entire plow can swivel up and down to match the terrain over which it is pulled. Further adjustment occurs in the mounting of disks 14 on axles 26 to permit adjustable mounting inwardly or outwardly on axle 26 to adjust to different tire widths.

By way of example, a device constructed according to the present invention was tested with two disks set to oppose each other, pulling dirt which had been pushed into a rut by sprinkler tires. After appropriate adjustments as described in the preceding paragraph, the mounds of dirt pushed into a pair of parallel ridges were thrown inwardly into the depression left by the tires, thereby levelling the ground and avoiding problems otherwise resulting from traverse by various farm equipment. When pushed in the reverse direction, the disks automatically swiveled to the position for reverse motion (shown in phantom in FIG. 3) without requiring manual attention by an operator.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with ground wheel means subject to forming a depressed track in the earth over which the wheel means rolls, a plowing implement for levelling the track produced in the earth by the wheel means moving in a forward direction, comprising plowing means for followingly throwing earth adjacent the track into the track, mounting means for adjustably mounting the plowing means, and a pulling assembly connecting the mounting means to the wheel means, wherein the mounting means is adapted for swiveling in response to change in direction of the wheel means, whereby the plowing implement is protected against damage during reverse movement of the wheel means without substantially impeding said reverse movement, said pulling assembly including follower means to permit the plowing means to match the contour of the earth, said plowing means comprising a pair of disks mounted opposably the mounting means, the disks when in use describing a path of travel over the earth immediately adjacent the track and forming an acute angle with respect to their direction of travel, whereby the disks travel over the earth adjacent the track and throw said adjacent earth into the track, said pulling assembly comprises said follower means, together with a pull bar fixedly mounted on the wheel means and a channel bar to which the mounting means is attached, the channel bar being connected by the follower means to the pull bar, the follower means further comprising a follower rod attached to the pull bar and terminating directly behind the wheel means and when in use also terminating above the tracks, the follower means further including a swivel collar to which the channel bar is rigidly attached, the swivel collar being freely rotatable on the follower rod to permit the channel bar mounted thereby to pivotably adjust the elevation of the mounting means in response to the contour of the earth, the follower means further comprising adjustable locking collars to prevent longitudinal sliding of the swivel collar on the pull bar and to center the disks upon said adjacent earth.

2. The implement of claim 1 wherein said mounting means comprises a pair of axles mounting the disks by adjustable means for spacing the opposed disks apart from each other, the mounting means further including a pair of L-shaped support beams, each support beam having a vertical portion fixedly attached at the lower end thereof to an axle, the support beam having a horizontal portion attached at the end thereof by fastening means to the channel bar with the vertical portion of the support beam extending outwardly, the angle between the horizontal portion of the support beam and a perpendicular to the channel bar defining the angle formed between the disk associated therewith and its direction of travel, said angle being adjustable by holding means, the holding means further being adapted to permit swiveling forwardly of the support beam on the fastening means in the event of a change of direction of the wheel means from the forward to the rearward direction.

3. The implement of claim 2 wherein said fastening means comprises selectable mounting holes on said channel bar and said holding means comprises for each support beam a holding rod pivotably attached near the forward end of the channel bar for pivotable motion in a horizontal plane, the holding rod being attached by slidable means near the rearward portion of the holding rod to the horizontal portion of the support beam medially of the end of the horizontal portion of the support beam attached to the fastening means and the vertical portion of the support beam.

4. The implement of claim 3 wherein the slidable means comprises an adjusting collar, a forward stop for controllably limiting the forward sliding of the adjusting collar, and a rear stop for controllably limiting the rearward sliding of the adjusting collar on the holding rod and for defining said angle, the adjusting collar having attached thereto a connecting pin pivotably attachable to the support beam, whereby the integral between the forward stop and the rearward stop defines the extent of swiveling of the disk during reversal of direction of the wheel means.

5. The implement of claim 4 wherein said wheel means comprises a pair of sprinkler wheels serially connected to support a sprinkler support assembly, the pull bar being mounted on the sprinkler support assembly by a bracket bolted thereto.

6. In combination with a prime mover, a swivelable mounting structure to be pulled by said prime mover, the mounting structure comprising pulling means connected at one end thereof to the prime mover, axle means for pivotably mounting an agricultural implement, and holding means for defining the pivotable relationship between the axle means and the pulling means, the holding means further permitting swiveling of the axle means forwardly to a predetermined limit upon change of direction of the prime mover from the forward to the reverse direction, said holding means comprises a holding rod pivotably attached at one end thereof to the end of the pulling means nearest the prime move, the axle means being pivotably attached to the pulling means rearwardly thereof, the holding means being further pivotably and slidably attached to the axle means outwardly of the attachment of the axle means to the pulling means, said holding means comprising a collar carried by the axle means through which the other end of said holding rod is slidably received and a pair of limit stops on said holding rod engageable by said collar to limit sliding of the adjusting collar on the holding rod, the adjusting collar having a fixedly attached mounting pin for rotatable connection to the axle means outwardly of the pivotable mounting of the axle means on the pulling means.

7. In combination with a wheeled frame subject to movement in forward and reverse directions and to forming a depressed wheel track in the earth over which the frame moves, support means anchored to said frame, horizontal mounting structures pivotally mounted from said support means for angular displacement relative thereto about spaced upstanding axes positionable on opposite sides of said track, ground working means supported from said mounting structures and horizontally spaced therealong from said axes whereby they would be displaced away from said track, limit means adjustably connected between said mounting structures and said support means for adjustably limiting oscillation of said mounting structures about said axes, said horizontal mounting structures comprising elongated axles and said ground working means comprising a pair of cultivator-type disks each journalled on a corresponding one of said axles, said axles being freely swingable about said upstanding axes between opposite rearwardly and outwardly inclined positions and forwardly and outwardly inclined positions determined by said limit means, whereby said disks, in both directions of movement of said wheeled frame will deflect earth engaged thereby toward the center line of said track from opposite sides thereof, said limit means comprising a generally horizontal sleeve pivotally mounted on each of said mounting structures for angular displacement about a further upstanding axis, a pair of rods including front and rear ends, the forward ends of said rods being pivotally supported from said support means, the rear end portions of said rods each being slidably received through a corresponding one of said sleeves, said rods each including longitudinally spaced abutments adjustable therealong and disposed on opposite sides of the corresponding one of said sleeves, said support means comprising a front to rear extending support arm, the forward end of said support arm being oscillatably supported from said frame for angular displacement about a horizontal transverse axis, said mounting structures being pivotally supported from opposite side portions of the rear end of said support arm and projecting laterally outwardly therefrom, the forward ends of said rods being forwardly convergent and being pivotably supported from the forward end portion of said support arm.

* * * * *